United States Patent [19]
Maliszewski et al.

[11] 4,099,170
[45] Jul. 4, 1978

[54] LIGHT PEN DETECTION FOR PLASMA PANELS USING SPECIALLY TIMED AND SHAPED SCAN PULSES

[75] Inventors: Stephen Raymond Maliszewski, Leonardo; Peter Dinh-Tuan Ngo, Colts Neck, both of N.J.

[73] Assignee: Bell Telephone Laboratories, Incorporated, Murray Hill, N.J.

[21] Appl. No.: 726,534

[22] Filed: Sep. 27, 1976

Related U.S. Application Data

[63] Continuation-in-part of Ser. No. 599,766, Jul. 28, 1975, abandoned.

[51] Int. Cl.² .................................... H01J 17/48
[52] U.S. Cl. .................... 340/324 M; 315/169 TV
[58] Field of Search .......... 340/324 M, 343, 173 PL; 315/169 R, 169 TV

[56] References Cited

U.S. PATENT DOCUMENTS

| | | | |
|---|---|---|---|
| 3,559,190 | 1/1971 | Bitzer et al. | 340/173 PL |
| 3,651,509 | 3/1972 | Ngo | 340/324 M |
| 3,750,159 | 7/1973 | Wojcik | 340/324 M |
| 3,768,073 | 10/1973 | Rawson et al. | 340/172.5 |
| 3,851,327 | 11/1974 | Ngo | 340/324 M |
| 3,875,472 | 4/1975 | Schermerhorn | 315/169 R |
| 3,938,107 | 2/1976 | Criscimagna | 315/169 TV |
| 3,967,267 | 6/1976 | Ngo | 340/324 M |
| 3,969,715 | 7/1976 | Lamoureux | 315/169 R |
| 3,976,912 | 8/1976 | Miavecz et al. | 315/169 TV |

*Primary Examiner*—David L. Trafton
*Attorney, Agent, or Firm*—Ronald D. Slusky

[57] ABSTRACT

An enhanced light pen capability for plasma display panels is provided by applying specially timed scan write and scan erase pulses to the cells of the panel, the pulses being shaped and positioned relative to the normal sustain pulse sequence such that a light pulse is emitted, while avoiding any but transient modification of the cell wall voltage. The light pulse is detected by a light pen of standard design. Dynamic keep-alive circuitry for applying location-dependent priming enhances the operating margins.

12 Claims, 13 Drawing Figures

LIGHT PEN DETECTION FOR PLASMA PANELS USING SPECIALLY TIMED AND SHAPED SCAN PULSES

CROSS REFERENCE TO RELATED APPLICATION

This application is a continuation-in-part of our co-pending application, Ser. No. 599,766, filed July 28, 1975, now abandoned.

BACKGROUND OF THE INVENTION

The present invention relates to display systems for use in cooperation with a computer or similar control system. The invention more particularly relates to circuitry for adding a light pen capability to plasma and similar display systems.

Plasma display panels in which light is emitted from an array of individual gas discharge cells are well known in the art. For example, Bitzer et al. U.S. Pat. No. 3,559,190 issued Jan. 26, 1971 describes an early development in the field. Plasma display panels are in some respects similar to well-known cathode ray tube (CRT) arrangements such as those described in W. H. Ninke U.S. Pat. No. 3,653,001 issued Mar. 28, 1972 and R. A. Koster U.S. Pat. No. 3,389,404 issued June 18, 1968. An important difference, however, is that plasma display panels have inherent memory. That is, they need not be constantly refreshed by an information-bearing signal corresponding to the desired visual image.

More particularly, each cell of a plasma display panel includes a volume of ionizable gas. A selected cell is established in the ON (energized, light-emitting) state via a write pulse, the magnitude of which exceeds the breakdown voltage of the gas. A glow discharge is thereby created at the selected cell and a single, short, e.g., one microsecond, light pulse is emitted. The write pulse also stores a "wall" voltage across the gas of the selected cell. Alternating polarity sustain signals, which are constantly applied to all cells of the panel, thereafter combine with the wall voltage to effect successive discharges and to maintain wall voltage storage. The sustain signal frequency may be on the order of 50 kHz so that the individual light pulses emitted by the cell are fused by the eye of the viewer and the cell appears to be continuously light-emitting. The magnitude of the sustain signals is less than the gas breakdown voltage so that cells which have not received a write pulse, and thus at which no wall voltage has been stored, remain OFF (de-energized, non-light-emitting).

A cell in the ON state is returned to the OFF state by applying an erase pulse thereto. The magnitude of the erase pulse is sufficient in combination with the wall voltage stored at an ON cell to cause a breakdown. However, the magnitude and duration of the erase pulse are such that there is no further wall voltage storage. Hence, no further discharges occur.

A useful adjunct to any computer-based display system is a so-called light pen for communicating to the computer or other control mechanism a location on the display surface. In typical CRT display systems, such as those described in the above-mentioned Ninke and Koster patents, a light pen placed on the CRT surface signals the computer or other control device the instant that refresh information applied to the CRT causes the phosphor adjacent to the pen tip to emit light. Data identifying the point on the CRT surface being refreshed at any given time is correlated with the light pen signal to identify the location of the pen on the CRT surface.

Plasma display panels are not usually operated in a sequential scan refresh mode. Rather, all ON cells emit a light pulse, or "flash," at the same time, and in response to the sustain signals applied to all cells. Thus, light pen circuitry for plasma display systems operates somewhat differently. For example, P. D. Ngo U.S. Pat. Nos. 3,851,327 issued Nov. 26, 1974 and 3,967,267 issued June 29, 1976 disclose specially adapted "scan write" and "scan erase" pulses which are applied to the cells of a plasma display panel in pairs at a time when the ON cells of the panel are between sustain-initiated flashes. The scan write and scan erase pulses flash OFF and ON cells, respectively, a single time without altering the cell state. The light pen output is ignored at standard ON cell flash times. However, once the pen signals at a nonstandard time that the cell to which it is adjacent has flashed, the position of the pen on the panel surface is known, since the location of the cell which was most recently flashed is known.

An important factor in designing light pen detection circuitry for plasma display panels is consideration of the typically narrow operating margins for scan signals. This is caused, at least in part, by the fact that the breakdown voltages associated with the cells of a plasma panel vary over a range of values in more or less random fashion. Accordingly, some care must be exercised in the choice of scan pulse amplitude, duration and shape to ensure that spurious writing and erasing of cells does not occur, on the one hand, while ensuring reliable cell flashing, on the other hand.

A light pen detection system with wide operating margins is described, for example, in the above-mentioned '267 patent. In particular, the scan write pulse of that patent is characterized by a magnitude sufficient to create a glow discharge and light flash at an OFF cell. The cell is prevented from switching to the ON state by utilizing a short pulse duration, for example. This minimizes the amount of wall voltage stored in response to the scan write pulse, ensuring that the magnitude of whatever wall voltage is stored, is less than the difference between the breakdown and sustain signal voltages. Hence, the cell is not switched to the ON state by the scan write pulse. The '267 patent also discloses that the storage of wall voltage in response to the scan write pulse can be further minimized by providing the pulse with a tapered, rather than an abrupt, or sharp, trailing edge. This advantageously allows the scan write pulse magnitude and duration to be made sufficiently large to ensure that OFF cells with relatively high breakdown voltages will, in fact, flash while minimizing the danger that an inordinately high wall voltage might be stored at OFF cells having relatively low breakdown voltages, thereby undesirably switching such cells to the ON state.

SUMMARY OF THE INVENTION

We have now discovered, however, that for some combinations of scan write pulse parameters, e.g., magnitude and duration, and for different types of plasma panels, storage of wall voltage is minimized by utilizing a scan write pulse which has an abrupt, rather than a tapered, trailing edge and which terminates at a sufficiently low value (e.g., ground) that the wall voltage just stored by the pulse can give rise to a so-called "second breakdown" which actually reduces the wall voltage. This advantageously allows the selection of scan write pulse parameters which are sufficiently large to ensure OFF cell flashing without threatening to switch OFF cells to the ON state.

More particularly, we have discovered that for a given scan write pulse width, a plasma display cell has a first so-called "flashing range" for the abrupt trailing edge scan write pulse and a second "flashing range" for the tapered trailing edge scan write pulse. In each case the flashing range is the range of scan write pulse magnitude over which an OFF cell will reliably flash without switching to the ON state. In accordance with an aspect of the invention, a scan write pulse is provided with an abrupt trailing edge when the above-mentioned first flashing range is greater than the second flashing range, inasmuch as this provides better operating margins, as is discussed in detail hereinbelow. In fact, we have found that for some types of plasma panels, only the abrupt trailing edge scan write pulse of the present invention provides sufficient operating margins to ensure reliable OFF cell flashing.

The scan write pulse of the present invention may be advantageously used in conjunction with the scan erase pulse disclosed, for example, in the above-mentioned '327 and '267 patents to flash ON cells of a plasma display panel and also in conjunction with dynamic keep-alive circuitry, such as that disclosed in P. D. Ngo U.S. Pat. No. 3,979,638 issued Sept. 7, 1975.

DETAILED DESCRIPTION

Basic Device Characteristics

Before discussing the improvements resulting from the present invention, it is considered advisable to briefly review typical prior art plasma display systems. The above-cited Bitzer et al. patent, and the paper by Johnson and Schmersal, "A Quarter-Million-Element AC Plasma Display With Memory," *Proceedings of the Society for Information Display*, Vol. 13, No. 1, First Quarter 1972 (and other articles in that issue) provide a useful summary of such systems.

A typical plasma display panel is comprised of a rectangular array of gas discharge cells. In the most basic embodiment of the device, a two-level digital display, the entire array of cells is excited by an alternating polarity (e.g., bi-polar pulse) signal which is of insufficient magnitude by itself to initiate gas discharges in any of the cells. If, however, positive and negative charge carriers have been stored at opposite cell walls as the result of a previous discharge, the voltage across the cell gas due to a sustain pulse combines additively with the voltage impressed thereacross by the above-mentioned "wall" charge. This combined voltage initiates a new discharge, storing a wall voltage of polarity opposite to that which previously obtained. On the following half cycle of the sustain signal, the sustain and wall voltages again combine additively across the cell gas, creating yet another discharge, and so forth. In this way, a sequence of discharges, once started, can be sustained by the alternating polarity sustain signal which cannot initiate that sequence by itself.

Typically, the cells of a plasma display panel in the OFF state are characterized by the absence of a discharge sequence and therefore the absence of light output from those cells. Cells in the ON state are characterized by glow discharges and associated light pulses occurring once during each half cycle of the sustain voltage. The stability characteristics and nonlinear switching properties of the cells are such that the state of any selected cell in the array can be changed by selective application of coincident address, e.g., write and erase, voltages to a row and column electrode pair associated with the selected cell. These voltages accomplish selective state changes by perturbing the wall voltage of the cell being addressed.

Figure 1:
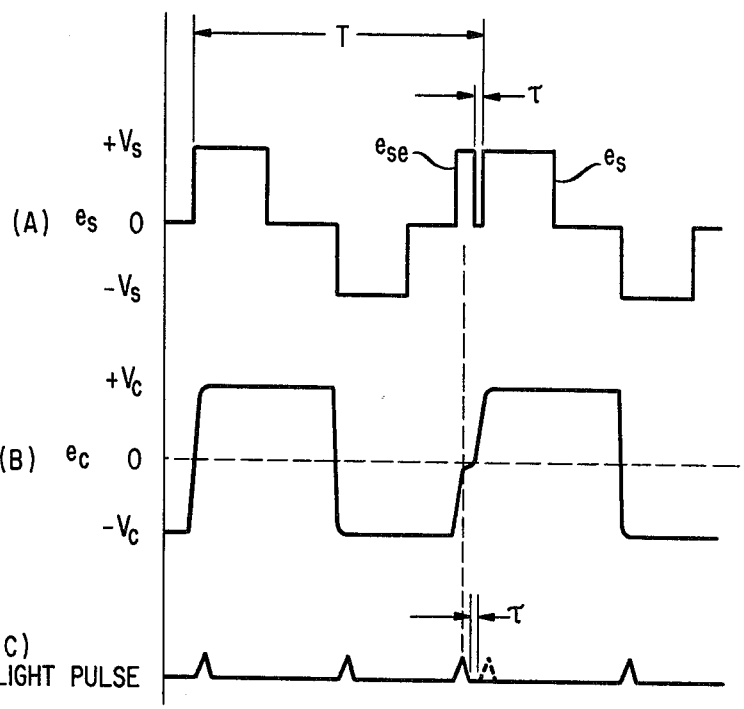
FIG. 1 summarizes the timing, and effect on cell voltage and emitted light pulses of a scan erase pulse.

FIG. 1 illustrates a typical sustain signal $e_s$ suitable for application to cells in a plasma display panel. During each T-second sustain cycle shown in waveform A, a bipolar pulse sequence applied to an ON cell gives rise to a cell wall voltage varying between $\pm V_c$ and to the first two light pulses shown in waveform C.

A positive scan erase pulse $e_{se}$ terminating $\tau$ seconds prior to the appearance of a positive sustain pulse has the effect of "flashing" the cell, as manifested by the third light pulse shown in waveform C. The application of this scan erase pulse and its utilization in a plasma panel/light pen system are described in the above-mentioned '327 and '267 patents, which are hereby incorporated by reference. For the present disclosure, therefore, it is sufficient to note that the proximity of scan erase pulse $e_{se}$ to the following sustain pulse is such that, unlike the effect of a conventional erase pulse, the charge stored at the cell walls is not completely depleted by pulse $e_{se}$. That is, the sustain pulse follows the scan erase pulse sufficiently closely that it restores enough of the charge that was depleted by the scan erase pulse that in subsequent half cycles, normal discharges occur as before. This is denoted by the final light pulse in waveform C in FIG. 1. If a normal erase pulse, terminating earlier than $\tau$ seconds prior to the following sustain pulse, had been applied to an ON cell, the wall voltage would have been depleted to a point such that recovery of the wall charge would not be possible. Thus, a true erase would have taken place.

The overall effect of the scan erase pulse is to generate a uniquely-timed light pulse, or flash, while disturbing the state of ON cells only very briefly. The charge state of OFF cells is not disturbed at all, and because an erase pulse (scan or otherwise) is of a magnitude approximating a sustain signal, no light pulse is emitted by OFF cells when an erase pulse is applied.

Scan Write Pulse

Because scan erase pulses do not flash OFF cells, their applicability is limited. Thus, for example, a common application of light pen interaction involves pointing and drawing on a display device. Using the basic scan erase technique on a plasma panel limits pointing to those cells which are in the ON state. Thus, for example, if a pointing (and detection) operation is followed by a true erase, it is possible to write a dark-on-light image on a plasma panel. No light-on-dark operation is possible using the scan erase technique because no pointing is possible with respect to OFF cells.

Advantageously, a scan write pulse can be used to overcome these limitations. To appreciate the operation of a scan write pulse, it is useful to review the operation of a conventional write pulse.

Figure 2:
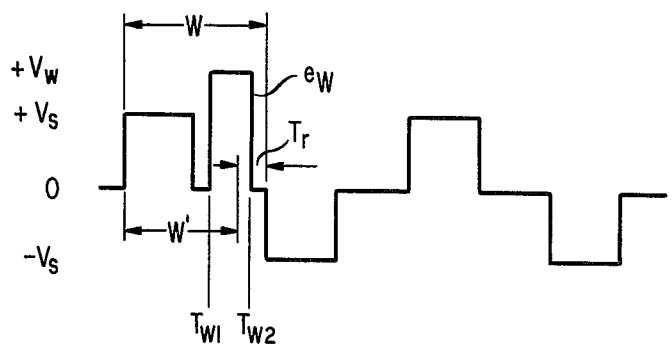
FIG. 2 illustrates typical conventional write and sustain voltage waveforms.

FIG. 2 illustrates the typical magnitude and timing of a conventional write pulse $e_w$ relative to a normal sustain signal. Pulse $e_w$ has magnitude $V_w$, a level greater than the magnitude, $V_s$, of the sustain signal. The write pulse duration, which is greater than the duration of an erase pulse, for example, is selected as a function of such factors as cell geometry and gas composition and pressure. Further, the placement of the write pulse must be such that it precedes a sustain pulse of opposite polarity by a period not exceeding the memory recovery time, $T_r$, associated with the particular pulse magnitude and duration selected. Thus, while the write pulse may appear within the "window" W in FIG. 2, it must not be wholly confined to the smaller window, W', ending $T_r$ seconds prior to the following sustain pulse. With a pulse like that shown as $e_w$ in FIG. 2, a light pulse is generated, and sufficient charge is stored at the cell walls so that the following negative sustain pulse adds to the voltage associated with the stored charge to again cause a gas discharge. The cell is thus established in the ON state.

From the above brief summary of the write operation, a first requirement for a scan write pulse appears. While causing a breakdown at an OFF cell, a scan write pulse must not store so much charge that the following sustain pulse will establish the OFF cell in the ON state. This charge storage limitation could, theoretically, be achieved by lowering the voltage of a scan write pulse. If lowered too much, however, the scan write pulse will fail to cause the desired cell flashing. Further, and perhaps most importantly, existing plasma panels are often very critically adjusted. The magnitude of a pulse that will consistently flash a cell at any desired location on a panel, while avoiding the switching of a cell to the ON state, typically can vary over only a quite narrow range.

It also might appear possible to locate a scan write pulse at a point preceding a sustain pulse of the same polarity. Such a positioning alone, however, would establish a charge which would oppose the succeeding sustain pulse and therefore cause an extinction of the discharges at a cell theretofore established in the ON state. Since in general, there is no a priori knowledge as to whether a cell is ON or OFF, spurious erasing would be caused by such a scan write pulse. Further, it would not be discernible from the detected light pulse whether the cell from which the light pulse originated was ON or OFF.

Figure 3:
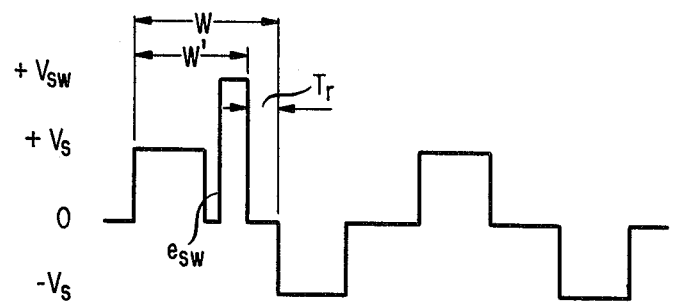
FIG. 3 illustrates a modification of the conventional write pulse to provide a scan write pulse in accordance with one aspect of the present invention.

A preferred choice for a scan write pulse in accordance with one aspect of the present invention is illustrated in FIG. 3. This pulse, $e_{sw}$, is shown within the window W' previously identified in connection with FIG. 2. Note that pulse $e_{sw}$ illustratively begins at the same time in the sustain cycle as a normal write pulse, but that it terminates at least $T_r$ seconds prior to the onset of the following sustain pulse. Note, also, that unlike the preferred scan write pulse of the above-mentioned '267 patent, the trailing edge of pulse $e_{sw}$ is abrupt, or sharp, rather than tapered. Under some circumstances, as is discussed in detail hereinbelow, an abrupt trailing edge has been experimentally discovered to give rise to a so-called "second breakdown" of the cell gas, thereby removing a portion of the stored charge. This advantageously allows the scan write pulse magnitude, $V_{sw}$, and duration to be made sufficiently large to ensure that OFF cells with relatively high breakdown voltage will, in fact, flash in response to the pulse, while minimizing the danger that an inordinately high wall voltage might be stored at OFF cells having relatively low breakdown voltage, thereby switching such cells to the ON state.

Figure 4:
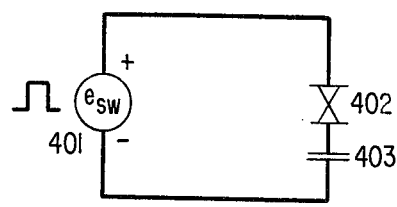
FIG. 4 shows an equivalent circuit representation for a plasma cell connected to a pulse source.

To facilitate an understanding of the "second breakdown" phenomenon, it is useful to consider the plasma cell equivalent circuit shown in FIG. 4. A scan write pulse source 401 is shown connected across the series combination of elements 402 and 403. Element 402 is a variable impedance component representing the breakdown mechanism of the gas in the cell. Element 403 is a capacitance representing the wall charge storage mechanism. Source 401 is a source of pulses having sufficient magnitude to effect the breakdown of element 402. The current resulting from such a breakdown causes a charge storage across element 403. The amount of charge stored is dependent, for example, on the magnitude and duration of the pulse used. It may be assumed that when the pulse from source 401 terminates, it returns to ground potential. Thus a voltage appears across element 402 equal to the voltage stored on element 403. This voltage may be sufficient to cause a second breakdown of element 402. This time, however, current flows in the opposite direction, removing some of the charge which was stored in response to the first breakdown. The principal reason that a tapered scan write pulse does not give rise to a second breakdown is that by the time the pulse reaches ground level, the wall charges have already begun to diffuse away from the immediate vicinity, reducing the wall voltage below a level necessary to create the second breakdown.

Since a conventional write pulse, such as pulse $e_w$, usually has an abrupt trailing edge, it too may cause a second breakdown. However, since pulse $e_w$ initially stores more charge across the cell and is sufficiently proximate to the following sustain pulse, its second breakdown will not reduce the cell wall voltage below the level necessary to establish the cell in the ON state.

Figure 12:
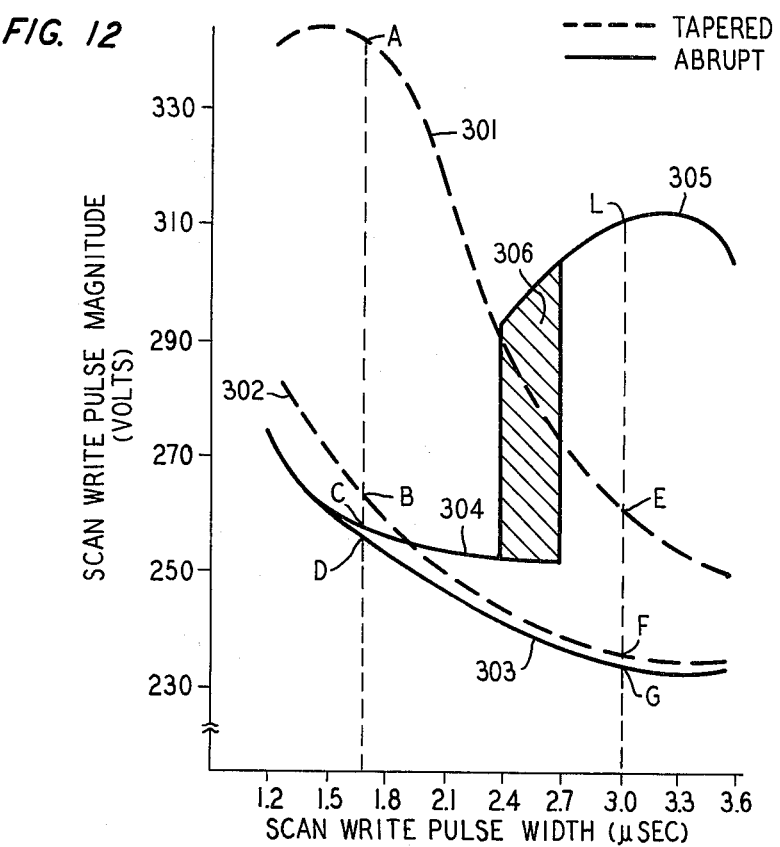
FIGS. 12 and 13 are graphs illustrating operating characteristics for both tapered and abrupt trailing edge scan write pulses.
Figure 13:
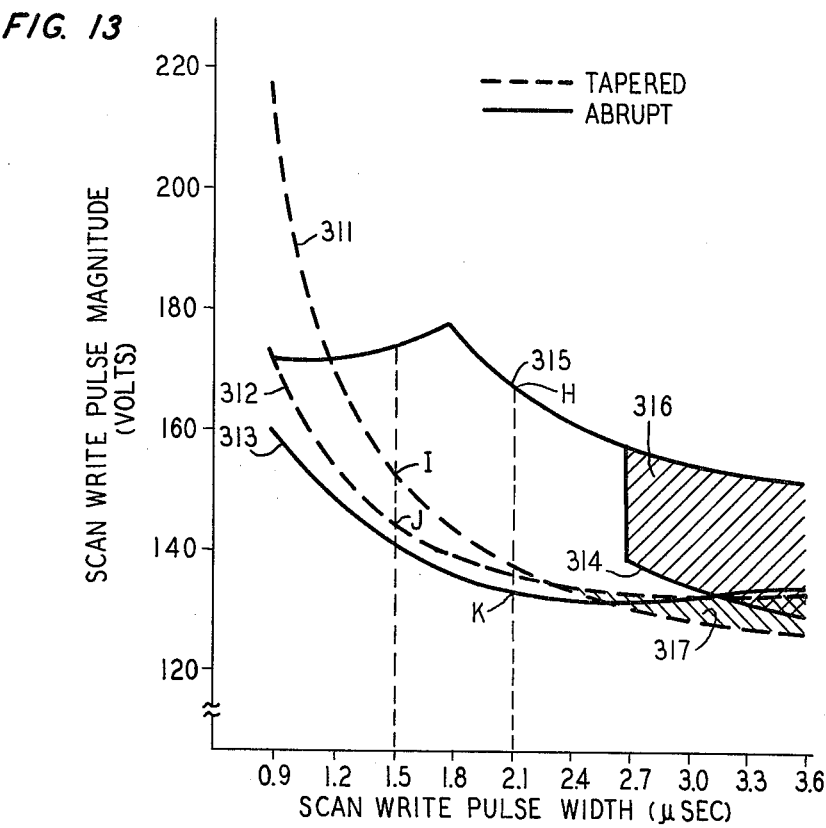

The graphs of FIGS. 12 and 13 represent experimental measurements we have made on two different types of plasma panels. These graphs are useful in illustrating the conditions under which the scan write pulse with tapered trailing edge of the above-mentioned '267 patent (hereinafter, tapered scan write pulse) and the scan write pulse with abrupt trailing edge of the present invention (abrupt scan write pulse), will reliably flash OFF cells of these two panels. (The time interval between the end of a scan write pulse, and the onset of the following sustain pulse was held constant in making these measurements, that interval being measured from the trailing edge 3-db point of each pulse.)

The graph of FIG. 12 represents experimental measurements made on an early type of commercially available plasma display panel. In particular, curves 301 and 302 represent the maximum and minimum allowable magnitude for a tapered scan write pulse as a function of pulse width, the latter being measured between the pulse 3-db points. For example, the magnitude of a tapered scan write pulse having a width of 1.7 $\mu$sec must be within the approximate range 265-340 volts. Any larger magnitude will switch the cell to the ON state due to the storage of too large a wall voltage. Any smaller magnitude will fail to cause a breakdown and the cell will not flash at all.

Curves 303, 304 and 305 and region 306 similarly define allowable magnitudes for an abrupt scan write pulse, such as pulse $e_{sw}$, again as a function of pulse width measured between the 3-db points. In particular, curve 303 defines the minimum magnitude necessary to ensure that the cell will break down and flash. Curve 304 defines the maximum magnitude for which 2.4 $\mu$sec or shorter pulses will flash a cell without switching it to the ON state. The low level of curve 304 results from the fact that abrupt scan write pulses of width less than 2.4 $\mu$sec cannot build up sufficient wall voltage (with reasonable pulse magnitude) to create a second breakdown when the pulse ends. In fact, for reasons that are not fully understood, the abrupt trailing edge of such pulses disadvantageously augments wall voltage storage here.

Curve 305 defines the maximum magnitude for which 2.7 $\mu$sec or longer pulses will flash a cell without switching it to the ON state. Strong second breakdowns are created in response to pulses having magnitudes above curve 305. However, so much charge is initially stored in response to such pulses that even after the second breakdown removes some of the wall charge, enough charge remains to establish the cell in the ON state. In a region extending directly below curve 305, the second breakdown does, however, remove sufficient wall charge to ensure that the cell does not switch to the ON state. Below that, in a region extending just above curve 303, there is no second breakdown but a cell does not switch to the ON state because only a small amount of wall charge is stored in the first instance.

The response of a cell to an abrupt scan write pulse within region 306 cannot be reliably predicted. This is a borderline region in which uncontrollable variables such as temperature, minor variations between nominally identical scan write pulses, and other factors come into play. Second breakdowns do occur within this region. For smaller magnitudes within region 306, however, the second breakdown is relatively weak and the amount of charge removed thereby may or may not be sufficient to prevent the cell from switching to the ON state. The second breakdown becomes stronger for larger pulse magnitudes within region 306 since the stored charge which gives rise to that breakdown is larger. In fact, there may be a relatively small region (not shown) within region 306 for which reliable flashing does occur. The amount of charge removed by a second breakdown as a function of the wall voltage giving rise thereto reaches an upper limit, however. Therefore, for still larger pulse magnitudes within region 306, the cell again enters a region of unreliable operation since the increased wall voltage storage due to increased pulse magnitude is not matched by increased wall charge removal. Again, the above-mentioned factors becom significant, making it uncertain whether the cell will flash, or whether it will switch to the ON state.

It will be appreciated that the graph of FIG. 12 represents the operational characteristics of a particular cell of a particular plasma display panel at a particular time and under particular operation conditions. This graph may vary, for example, as the panel ages and under other operating conditions, e.g., with the neighboring cells being in various ON and OFF states. Moreover, the corresponding graphs for other cells in either the same panel or in different panels of the same general type will be similar, but not identical, to the curves of FIG. 12. Additionally, nominally identical scan write pulses will, in fact, vary somewhat—both in magnitude and width. These and other factors must be taken into account in selecting scan write pulse parameters in order to ensure reliable scan write operation for all cells.

In FIG. 12, then, a good choice for a tapered scan write pulse would be, for example, a pulse having a nominal width of 1.7 $\mu$sec. The "flashing range" of a pulse of this width, i.e., the difference between the ordinates of points A and B, is large—75 volts. If a nominal pulse magnitude of, say, 310 volts is chosen, it will be appreciated that wide variations in characteristics between cells and variations in the pulses themselves will not jeopardize reliable flashing operation. By contrast, an abrupt scan write pulse having a 1.7 $\mu$sec width would be a poor choice for this kind of panel since the flashing range, i.e., the range between points C and D, is very small; any small variation in cell or pulse characteristics would likely often result in either the cell switching to the ON state or failing to flash at all.

If desired, however, an abrupt scan write pulse having a width of 3.0 $\mu$sec, for example, could be used. Note here that the flashing range L–G of such a pulse is much greater than the flashing range E–F of a tapered scan write pulse having the same width. Thus, for this selected pulse width, the abrupt pulse would be the better choice.

The ultimate choice of scan write pulse for a particular panel may be largely dictated by the fact that it is desirable to provide a scan write pulse with the same magnitude as the normal write pulse in order to keep the plasma panel circuitry as simple as possible. If, for example, the normal write pulse magnitude were to be 310 volts, the 1.7 $\mu$sec tapered scan write pulse would be a better choice over the 3.0 $\mu$sec abrupt scan write pulse since the 310 volt level is approximately at the center of flashing range A–B. The 310 volt level, by contrast, would lie at the high end of the flshing range of any abrupt scan write pulse, creating substantial danger of inadvertent ON state switching.

Although, as is illustrated by FIG. 12, there may be a choice between the tapered and abrupt scan write pulses for certain plasma display panels, this may not always be the case. The graph of FIG. 13, for example, represents experimental measurements we have made on a newer type of commercially available plasma pane- 1—the so-called MgO panel manufactured by Owens-Illinois, Inc. Curves 311-315 and region 316 in FIG. 13 correspond to curves 301-305 and region 306 in FIG. 12, respectively. Region 317 in FIG. 13 represents a further area of uncertainty—this time for the tapered scan write pulse—where the effect of the pulse on the cell cannot be reliably predicted.

Note here that for pulse widths less than approximately 1.0 $\mu$sec, the flashing range is greater for the tapered scan write pulse than for the abrupt scan write pulse. This might seem to suggest that a tapered scan write pulse of 1.0 $\mu$sec width could be advantageously employed here. It must be remembered, however, that the curves of FIG. 13 represent experimental measurements on a particular cell of a particular panel and it turns out that the flashing range associated with very narrow, e.g., 1.0 $\mu$sec, scan write pulses (of either type), tends to vary widely from cell to cell and panel to panel. Moreover, the typical conventional write pulse magnitude for this panel is 150 volts. A different, higher voltage, e.g., 190 volts, would have to be employed in using a 1.0 $\mu$sec tapered scan write pulse, adding to the complexity and cost of the panel circuitry.

For pulse widths greater than 1.0 $\mu$sec, the abrupt scan write pulse has the greater flashing range, and the limits thereof are not as variable from cell to cell as is the case for narrower scan write pulses. In addition, there is an abrupt scan write pulse width, e.g., 2.1 $\mu$sec, for which the conventional write pulse magnitude, 150 volts, lies at approximately the center of the flashing range, e.g., H–K, providing good operating margins. Note that a tapered scan write pulse having the conventional write pulse magnitude of 150 volts and a width of, say, 1.5 $\mu$sec might reliably flash the particular cell represented by the curves of FIG. 13. However, the narrow flashing range I–J creates substantial danger that such a pulse would lie outside the flashing range of the other cells in the panel. Note, too, that due to the steepness of curves 311 and 312, relatively small variations in tapered scan write pulse width resulting, for example, from circuit operation variables, will also tend to move a pulse of fixed magnitude out of the flashing range.

It is thus seen that for the panel represented by the graph of FIG. 13, the abrupt scan write pulse of the present invention is the only practical alternative.

To further improve operating margins, it proves convenient to introduce a dynamic keep-alive mode of panel operation of the type described, for example, in P. D. Ngo U.S. Pat. No. 3,979,638 issued Sept. 7, 1976, which is hereby incorporated by reference. That patent discloses that more uniform breakdown voltage among the cells of a plasma panel is achieved by varying the time delay between the energization of particular priming, or keep-alive, cells conventionally used in plasma panels, on the one hand, and the application of an address (e.g., write) pulse to a particular cell of the panel on the other hand, the time delay variation being a function of the distance between the keep-alive cells and the cell being addressed.

Combined Scan Erase and Scan Write

Figure 5:
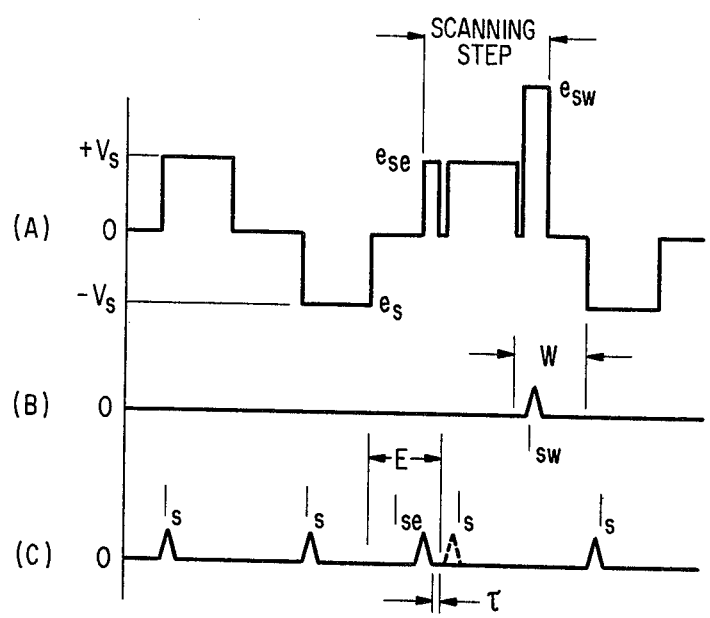
FIG. 5 illustrates a composite waveform including both a scan write pulse and a scan erase pulse, as well as light pulses resulting from the application of the composite waveform to OFF and ON cells.

To render a light pen useful as a completely unrestrained pointing tool in connection with a plasma display panel, it remains only to combine the scan erase and scan write pulses in a single waveform. Such a waveform is illustrated in FIG. 5. Thus in a single "scanning step," a scan write pulse $e_{sw}$ and a scan erase pulse $e_{se}$ are advantageously superimposed on a normal sustain signal as shown in waveform A in FIG. 5. Waveform B illustrates the timing of a light pulse emitted by an OFF cell (resulting from the scan write pulse) and waveform C illustrates the timing of the light pulses emitted by an ON cell (resulting from the normal sustain signals and the scan erase pulse). The dash-line representation appearing after the third light pulse in waveform C shows where a light pulse would have occurred but for the application of scan erase pulse $e_{se}$.

Control and Drive Circuitry

Figure 6:
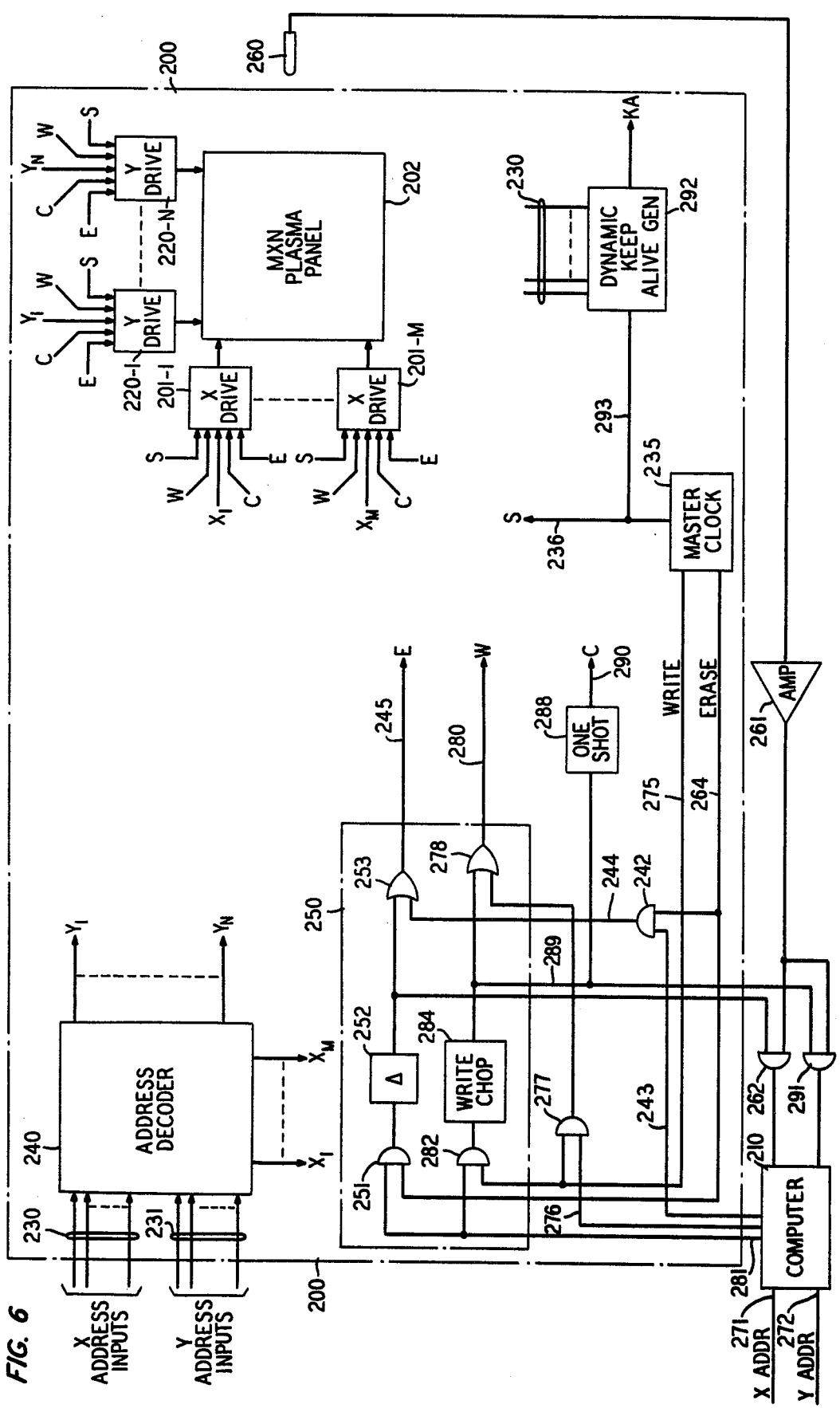
FIG. 6 shows an illustrative system in accordance with a preferred embodiment of the present invention for generating, applying, detecting and correlating signals associated with light pen use in a plasma panel.

FIG. 6 shows in block diagram form illustrative circuitry for accomplishing the functions associated with the waveforms shown in FIGS. 1-3 and 5 and described above. A plasma display system 200 is shown which (excepting the portion contained in dashed lines 250 and excepting dynamic keep-alive generator 292) represents functional elements contained in a standard plasma display system of the type described in the Bitzer et al patent and the Johnson and Schmersal paper, supra. An M by N cell plasma display panel 202 is seen to have connected to it individual drivers associated with the respective rows and columns of the matrix display. Since the panel is assumed to be of dimensions M by N, there are M row, or X, drivers 201−$i$, $i$ = 1,2, . . . M. Similarly, there are N column, or Y, drivers 220−$j$, $j$ = 1,2, . . . N. Signals generated by master clock 235 on a lead pair 236 are extended to the S inputs of drivers 201−$i$ and 220−$j$. The drivers respond to these signals in standard fashion to apply alternating polarity sustain signals to each cell of the panel.

Individual row and column drivers of FIG. 6 are addressed in standard fashion by a select signal indicated by the inputs $X_i$, $i$ = 1,2, . . . , M and $Y_j$, $j$ = 1,2, . . . , N, respectively. The address inputs to the respective X and Y drivers are, in turn, generated (at a rate of one per sustain cycle) by address decoder 240. The addresses to be decoded are supplied on a plurality of X and Y address inputs 230 and 231, respectively.

When it is desired to apply an erase pulse to the cell identified by the addresses on leads 230 and 231, an erase command signal is placed on lead 243 by controlling computer 210. This signal extends for the duration of an entire sustain signal, i.e., a duration of T seconds as shown in FIG. 1. The signal on lead 243 is ANDed in gate 242 with an erase timing signal generated by master clock 235 on lead 264. The erase timing signal defines the intrasustain cycle period over which a normal erase pulse occurs. The effect of ANDing the signals on leads 243 and 264 is to supply a pulse on lead 245 via lead 244 and OR gate 253 which defines an erase pulse interval for the current sustain cycle. This pulse is applied to the E inputs of each X and Y driver. The particular X driver also receiving a pulse on its $X_i$ input lead responds to the pulse on its E lead to apply a voltage of a first polarity and of magnitude equal to half the erase pulse magnitude to its associated cell row for the duration of the pulse on lead 245. Similarly, the particular Y driver receiving a pulse on its $Y_j$ input lead responds to the pulse on its E lead to apply a voltage of like magnitude but opposite polarity to its associated cell column. Thus, only the cell located in both the selected row and selected column receives a full erase pulse and, as desired, only that cell is erased.

When it is desired to apply a scan erase pulse to the cell identified by the addresses on leads 230 and 231, a computer 210 places a scan command signal on lead 281. The next erase timing pulse on lead 264 is thus passed through AND gate 251, delayed in delay unit 252 and then passed through OR gate 253 to lead 245, providing a delayed erase pulse, i.e., a scan pulse, to the selected cell.

It is desirable to have the scan erase pulse applied to cells over the entire surface of the plasma display panel to permit identification of an arbitrary ON cell. Accordingly, computer 210 is arranged to provide sets of leads represented by leads 271 and 272 with appropriate scanning addresses for application at respective inputs 230 and 231 of address decoder 240. When operated in a normal incrementing mode, computer 210 supplies a sequence of addresses at T-second intervals to cause each plasma cell on panel 202 to be addressed in turn.

Also shown in FIG. 6 is light pen 260 and associated amplifier 261. These are used in standard fashion to detect a light pulse occurring adjacent the tip of light pen 260 to signal computer 210 that a particular cell has emitted a light pulse. Computer 210 is conditioned in standard fashion to detect signals indicating the presence of a light pulse during a portion of the sustain cycle corresponding to the occurrence of the scan erase pulse. This selective detection is made specific in FIG. 6 by the inclusion of AND gate 262 which gates the amplifier 261 output with the signal appearing at the output of delay unit 252. Light pulses resulting from the normal sustain operation of the plasma panel and light pulses resulting from normal erase (or write) operations are thus ignored by computer 210.

The description presented thus far with respect to FIG. 6 relates primarily to ON cell detection and is based in large part on the discussion of FIG. 2 of the above-mentioned '327 patent. Further modifications to standard plasma panel circuitry and operating sequence will now be described. These latter modifications are useful in realizing the scan write function of the present invention and the dynamic keep-alive function which may be used to advantage in conjunction therewith.

In FIG. 6, the scan write pulse of the invention is illustratively derived from the normal write pulse. In generating the latter, clock 235 provides on lead 275 a clock pulse at the normal write interval, i.e., beginning at time $T_{w1}$ and ending at time $T_{w2}$ as shown in FIG. 2. When a normal write operation is to take place, computer 210 supplies a logic level write command signal on lead 276. The signals on leads 275 and 276 are ANDed in AND gate 277 before passing by way of OR circuit 278 to lead 280. Lead 280 extends to the W inputs of X and Y drivers 201−i and 220−j. As in the case of an erase signal, those X and Y drivers receiving signals both at their W inputs and at their $X_i$ and $Y_j$ inputs, respectively, apply respective write signal halves of opposite polarity to their associated cell row and cell column, thereby applying a full write pulse to the selected cell.

When a scan write signal is to be applied to a cell, the scan command signal from computer 210 on lead 281 causes AND gate 282 to pass the write timing pulse on lead 275 to write chop circuit 284. Write chop circuit 284 functions to generate a shortened, logic level version of the standard write pulse illustratively beginning at the same point in the sustain cycle as the normal write pulse, i.e., beginning at time $T_{w1}$ in FIG. 2. The shortening is effected in one embodiment by simply having the write chop circuit assume the form of a one-shot circuit having an output pulse duration equal to the desired scan write pulse duration. The one shot, then, is responsive to output of AND gate 282 beginning at time $T_{w1}$ to generate the shortened pulse. This shortened pulse is passed by way of OR circuit 278 and lead 280 to the W inputs of X and Y drivers 201−i and 220−j.

Plasma panel 202 is illustratively of the type which— for the scan write pulse duration which has been selected—has a greater flashing range when the scan write pulse has an abrupt trailing edge than when it has a tapered trailing edge. Thus, in accordance with the invention, the display system of FIG. 6 utilizes abrupt scan write pulses. In particular, the negative transition of the trailing edge of the pulse generated by circuit 284 activates oneshot circuit 288 which generates a pulse on lead 290. Lead 290 extends to the C inputs of drivers 201−i and 220−j, and the pulse thereon causes the row and column conductors of the cell in question to be clamped to ground through a low impedance. The effect of this clamping (circuit for which is provided on standard commercial a-c plasma panels) is to provide an abrupt trailing edge for the scan write pulse in accordance with the invention. Without this clamping, the normal turn-off mechanism associated with the drivers (when connected to the highly capacitive panel electrodes) would be such as to cause a gradually decreasing, or tapered, trailing edge for the scan write pulse. Equivalent clamping is also used in connection with the sustain drivers for the display cell electrodes, but such other clamping is not affected in practicing the present invention.

AND gate 291 functions in a manner similar to AND gate 262 in gating detected light pulses signals generated in response to the output pulse from write chop circuit 284. Thus a pulse output from either of gates 262 or 291 indicates that the currently addressed cell is in proximity with light pen 260, an output from gate 291 indicating that the cell is OFF and an output from gate 262 indicating that the cell is ON.

Dynamic Keep-Alive

Operation of the plasma display panel 202 in FIG. 6 may be enhanced in the normal sustain/write/erase mode using the dynamic keep-alive techniques described, for example, in the above-mentioned '638 patent, hereby incorporated by reference. Because such dynamic keep-alive techniques are especially advantageous in connection with scan write (and erase) pulses of the type described above, the manner of adapting such dynamic keep-alive functions to the system of FIG. 6 will now be described briefly.

Figure 7:
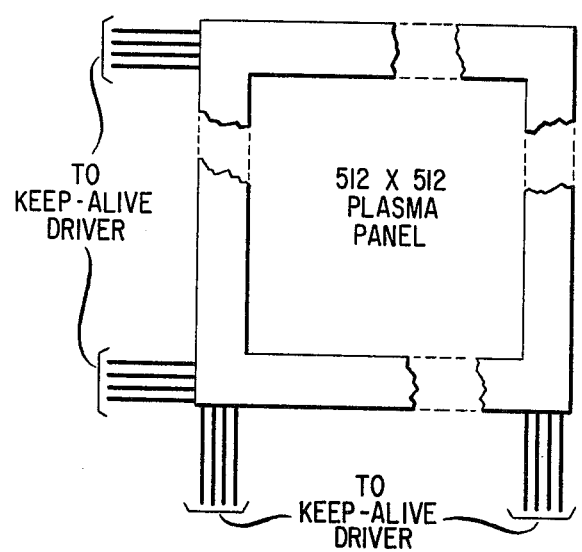
FIG. 7 shows typical placement of keep-alive electrodes on a plasma panel.

FIG. 7 shows a typical plasma panel comprising a 512 × 512 matrix of plasma cells. Bordering these display cells are bands of so-called keep-alive cells which typically exist in the ON state whenever the panel is operating. These keep-alive cells are substantially identical to the display cells, but often operate at a somewhat higher sustain level, $V_{ka}$, than do the normal display cells. In typical prior art systems the keep-alive cells are sustained in synchronism with the display cells, or, in any event, in a time relation to the display cells sustain cycle which is invariant with the location of cells being addressed.

In accordance with the dynamic keep-alive technique, the time of the keep-alive cell sustaining is adjusted to compensate for the relative remoteness from at least some of the keep-alive cells of a cell being addressed. In FIG. 6, the keep-alive sustain signals are generated by dynamic keep-alive generator 292. In general, then, all that is required is to selectively modify in dynamic keep-alive generator 292 the time occurrence of the normal keep-alive signals generated in response to signals provided by clock 235 on lead 293.

Assuming for simplicity that keep-alive cells are present only along the left and right margins of plasma panel 202, there being none at the top or bottom, the keep-alive sustain time modifications will correspond only to the column address of the cell currently being addressed.

One minor difficulty in controlling the exact time occurrence of the keep-alive sustain pulses arises from the fact that all cell voltages are derived on a half-select basis. Thus, in particular, the keep-alive sustain signals are derived in part from row signals and in part from column signals. The column select signals, moreover, are shared in common by the display cells and the keep-alive cells in each column. The display cell sustain signals are not to be time adjusted for particular addresses, however. Thus to obtain address-dependent keep-alive cell energization, while keeping one half-select component constant, requires that the other half-select component be slightly more complex than would otherwise appear to be necessary.

Figure 8:
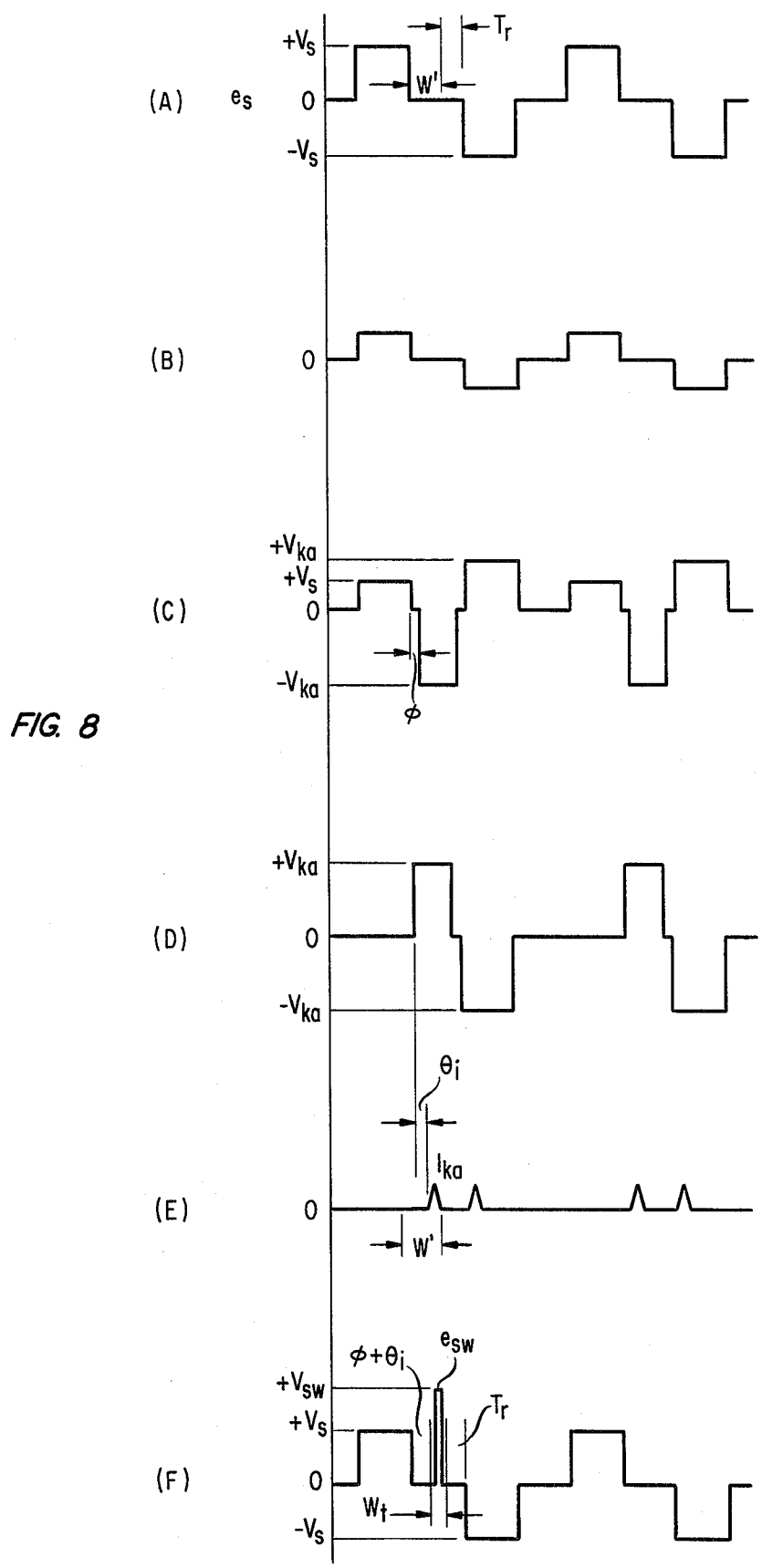
FIG. 8 shows waveforms useful in explaining the operation of dynamic keep-alive circuitry which may be used to advantage in conjunction with the present invention.

In FIG. 8, waveform A shows the desired net sustain voltage for a typical display cell, and waveform B shows the column component of the voltage of waveform A. Waveform C in FIG. 8 shows the other (row) required component so that the desired keep-alive sustain signal, shown in waveform D, results upon forming the algebraic combination B-C. This combination is performed by the panel structure in standard fashion.

The keep-alive light pulses are shown in waveform E as appearing a characteristic time $\theta_i$ after the beginning of the positive keep-alive pulse in waveform D. The beginning of this positive keep-alive pulse in waveform D occurs an address-dependent time $\phi$ after the completion of the positive-polarity column sustain signal in waveform B. Waveform F shows the positions of normal sustain signals and a scan write pulse, $e_{sw}$, relative to the various other waveforms in FIG. 8.

Figure 9:
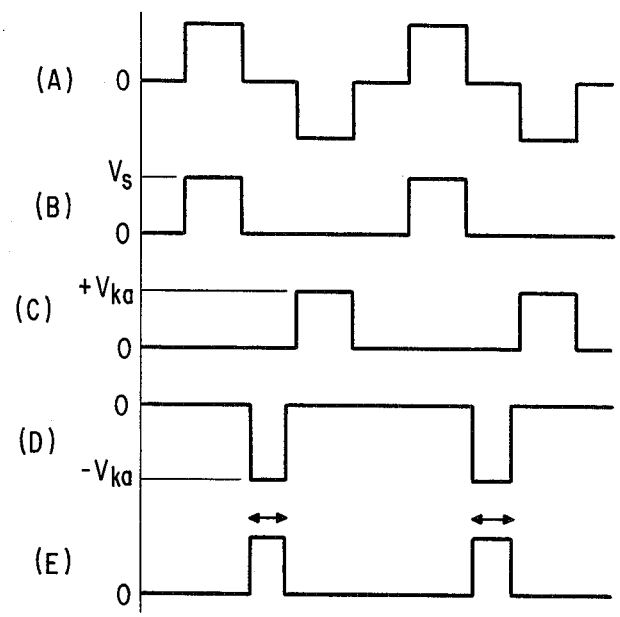
FIG. 9 shows the manner in which components of the waveforms of FIG. 8 may be combined.

FIG. 9 shows the various components of the keep-alive cell row voltage appearing in waveform C of FIG. 8. In particular, waveform B in FIG. 9 shows a signal of amplitude $V_s$, waveform C shows a waveform with magnitude $+V_{ka}$, and waveform D shows the waveform of magnitude $-V_{ka}$. To provide a time reference, the normal sustain signal applied to a display cell is shown in waveform A. Each of the waveforms B, C and D in FIG. 9 may be generated in standard fashion by gating with a clock signal having same timing as the waveforms B, C and D. Each of the gated signals will, of course, have the respective amplitudes indicated in FIG. 9. Gating of fixed level waveforms is precisely the way in which signals are applied to any row or column in a plasma panel. Thus given that signals of magnitude $\pm V_{ka}$ and $V_s$ are available in a standard commercial panel, all that is required is to generate in straightforward fashion the modified logic level control signals corresponding to waveforms B, C and D in FIG. 9.

It will be recognized that it is the timing of the component appearing in waveform D in FIG. 9 which is subject to time variation in dependence upon the address of a location being addressed. Thus the logic signal corresponding to the pulses in waveform D are suitably modified in response to the cell address signals. A circuit suitable for this purpose is shown in FIG. 10.

Figure 10:
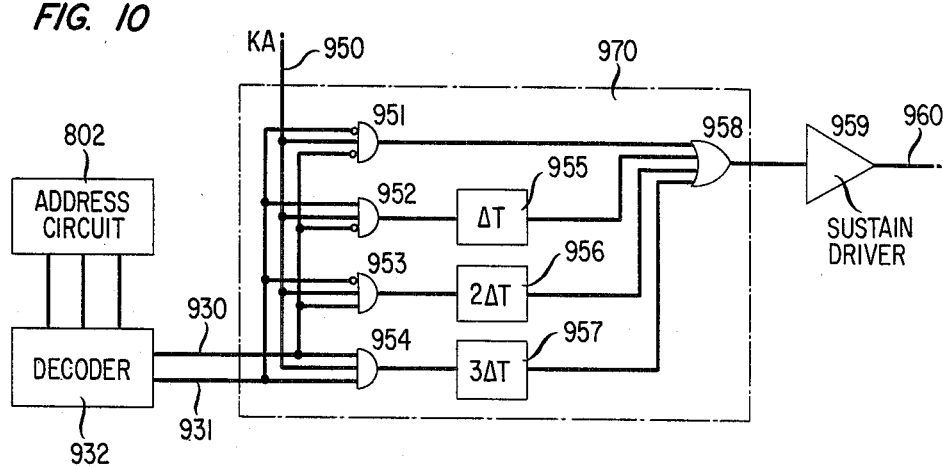
FIG. 10 shows simple circuitry for generating selectively delayed keep-alive signal components in response to applied address signals.

The circuit of FIG. 10 is adopted from one shown in the above-cited '638 patent, where it appears as FIG. 12.

Figure 11:
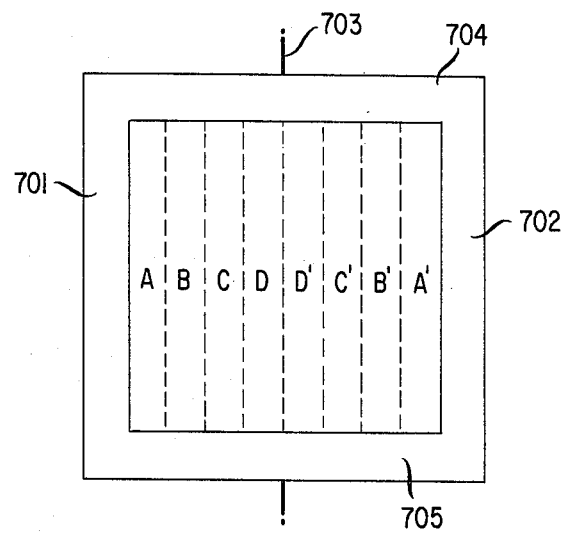
FIG. 11 shows segments of a plasma panel associated with the delays provided by the circuitry of FIG. 10.

In FIG. 10 hereof, a decoder 932 is shown as responsive to signals from address circuit 802. The signals from address circuit 802 correspond to column address inputs for the assumed case of keep-alive cells along the left and right margins only. Decoder 932 examines the three most significant bits of the column address and determines therefrom which of the eight vertical segments shown in FIG. 11 contains the address of the cell about to be accessed. Decoder 932 then provides signals on leads 930 and 931 to select one of the AND gates 951-954, thereby selecting no delay or a delay of $\Delta T$, $2\Delta T$ or $3\Delta T$. Thus if a clock signal having the form appearing in waveform E in FIG. 9 is applied on lead 950, an appropriately delayed replica of that waveform will form the output of OR circuit 958 suitable for application to sustain driver 959. Sustain driver 959 is, of course, the standard keep-alive driver arranged to gate not only the time-variable $-V_{ka}$ signals to lead 960, but also the fixed-time $+V_{ka}$ and $V_s$ signals as well.

The above-detailed description has illustrated the mannr in which a scan write pulse may be introduced in a standard plasma panel system both by itself and in connection with a scan erase pulse. Further the above description has indicated how both scan pulses may be utilized without giving rise to undesired crosstalk (undesired writing or erasing) or transient currents, while maintaining reasonable magnitudes for the operating voltages and signal margins. The modifications necessary to a standard plasma panel have been shown to be minimal, while the result obtained greatly enhances the applicability of plasma panel display devices.

While emphasis has been placed on the generation and detection of scan write and scan erase pulses in response to applied addresses, it is well now to illustrate the manner in which the addresses may be generated and the output signals from the modified plasma panel utilized to advantage. Initially it is well to consider the functions which are performed by computer 210. It is only necessary that computer 210 provide a continuous sequence of X and Y addresses on leads 271 and 272 for application to sets of input leads 230 and 231, respectively. As is well known, general purpose computers are well adapted for generating continuous sequences of address signals. In fact, this is perhaps the most typical mode of operation for general purpose program computers. That is, it is most common for such computer to access sequentially locations in its internal memory. For this purpose a program or address counter is successively incremented to provide the required sequence of address signals. For purposes of the present invention computer 210 may provide exactly those signals, beginning with an appropriate starting point such as the upper lefthand corner of the plasma panel, by successively incrementing the X location through M values while maintaining the Y address constant at the address for the first column, e.g., at $Y = 1$. This incrementing process for X may then be repeated with a new value of $Y = 2$, etc., until the entire panel is scanned.

Whenever a signal is generated as an output from one of the AND gates 262 or 291 indicating the detection of a write signal during the scan erase or scan write interval, respectively, computer 210 may be arranged to provide any of a range of functions. It may only be desired to have the current address (X and Y coordinates) noted in the computer 210, with nothing more taking place immediately. Thus if an image is displayed on the plasma panel corresponding, e.g., to a schematic diagram of an electrical circuit, it may only be required that a particular element, e.g., a resistor, be identified to a program then being executed in computer 210.

In other applications, the combination of an output from one of the gates 262 or 291 and the address signals may be used to modify the image then displayed on plasma panel 202. If, for example, the plasma panel is in a condition where all cells are in the OFF state, and the scan write signal gives rise to a signal at the output of AND gate 291 while the light pen is held adjacent a given location, it is elementary to have the state of the cell thus identified changed to the ON state. For this purpose all that is required is a temporary suspension in the scanning, i.e., incrementing of address signals, while the last address pair is reapplied to the sets of input leads 230 and 231, while also applying a write command signal on lead 276. Because the scanning and detection operations occur with such great rapidity, the last-mentioned scan write detection and cell state modification can take place while an operator is rapidly moving the light pen 260 over the surface of plasma panel 202. The overall effect achieved, then, is to permit writing (by changing OFF cells to ON cells) on the plasma panel. An exactly analogous procedure may of course be followed in connection with an all-ON state of the plasma panel cells. Thus upon detection of a particular ON cell by a scan erase pulse indicating signal at the output of AND gate 262, it is equally elementary to reapply the then-current address and also an erase command signal on lead 243. The effect, then, is to permit an operator to write on the plasma panel by switching to the OFF state cells adjacent to a moving light pen.

A significant advantage of the present invention, however, is that by combining both write and erase pulses in a specially timed, specially shaped combination during each sustain cycle, both ON and OFF cells may be detected and as appropriate, modified.

Other more complex operations by computer 210 are of course possible. The well-known "light button" techniques described, for example, in the above-cited Ninke patent may be adopted for use in connection with the present invention. Thus certain key words may be associated uniquely with subroutines in computer 210. By identifying a location at which these codes (or symbols) are located on the plasma panel 202, execution of the corresponding subroutines in computer 210 may be specified. For example, if a circuit analysis routine is stored in computer 210 and a corresponding designation displayed on plasma panel 202, which panel also may display an electronic or other circuit, it is elementary to have the computer be directed to execute circuit analysis routines with respect to the circuit then displayed on plasma panel 202. Computer 210 must, however, have already stored in it information corresponding to the circuit displayed on plasma panel 202.

Though the dynamic keep-alive feature of the present invention was described with respect to a panel having keep-alive cells only on two sides, obvious modifications in accordance with the teachings of the cited '638 patent may be applied to the present invention as well. Alternatively, the dynamic keep-alive technique of P. D. Ngo application Ser. No. 634,373 filed Nov. 24, 1975 could be used.

In appropriate cases, as where the distance of any display cell from a keep-alive cell is modest, it may not be necessary to incorporate the dynamic keep-alive feature. Further, in appropriate cases the scan write pulse techniques and circuitry may be used independently of the scan erase pulse techniques and circuitry.

It should also be clear that alternative means for generating the required sequences of address may be used. In particular, separate X and Y counters may have their outputs applied to the inputs 230 and 231, respectively, in FIG. 6. These counters may then be activated and advanced in standard fashion under the control of master clock 235 to generate a new address during each sustain cycle. These addresses may then be applied to computer 210 or other utilization circuitry when a light pen output occurs during the selected scan pulse interval. While not shown, it will occur to those skilled in the art to adjust delay and other time intervals to compensate for propagation delays encountered when computer 210 or other utilization circuitry is physically removed from the immediate vicinity of display system 200.

Different particular sustain sequences are known in the art. The scan write and scan erase pulses shown in the drawing and described above are merely typical. The cited '327 patent shows how the erase pulse may be selectively delayed (while being applied in a scanning manner) to permit light pen identification when different particular pulse sequences are used. In each case a delay of $\Delta$ seconds causes the otherwise normal erase pulse to approach the succeeding sustain pulse to within $\tau$ seconds. The same type of relative spacing of scan write pulses and succeeding sustain pulse of opposite polarity may be used to advantage in detection of OFF cells in systems having a variety of normal pulse patterns.

In some applications of standard commercial panels, the normal write pulse is superimposed on at least part of the normal sustain pulse of the same polarity. Thus, the window, W, as shown in FIG. 2 is extended leftward over the positive sustain pulse. This normal write sequence can likewise be modified to perform the scan write function by abruptly terminating the trailing edge of the normal write pulse to provide a large second breakdown. This prevents an actual write from occurring due to a "permanent" storage of charge at a cell. In addition, care must be taken to ensure that the scan write pulse trailing edge terminates at a sufficiently low voltage, e.g., ground, that the charge initially stored by the pulse can give rise to the second breakdown, as described above, inasmuch as such may be needed to ensure that the cell does not switch to the ON state. Care must also be taken that the scan write pulse not be shifted to within $T_r$ seconds of the following sustain pulse of opposite polarity.

In panels of the above-described type in which the write pulse is superimposed on at least a part of the sustain pulse, the smaller voltage excursion of the write pulse leading edge may not, if its rise time is relatively long, generate a light pulse of sufficient amplitude that it can be readily sensed by the light pen. In such panels, then, special care should be taken to provide a very abrupt leading edge from the scan write pulse.

The present disclosure has proceeded on the assumption that each cell is to be an element for scanning purposes, i.e., each plasma or other cell is scanned separately in sequence. No such limitation is fundamental to the present invention, however. Thus entire rows, columns, quadrants or any other segment of a display surface may be considered as a scanning element using straightforward modifications to the circuitry disclosed. If sufficient program or other logical control can be resorted to, a more efficient scanning involving, e.g., successively smaller areas can be used. Thus, for example, search procedures of the type described in U.S. Pat. No. 3,651,508 issued Mar. 21, 1972 or U.S. Pat. No. 3,938,137 issued Feb. 10, 1976 may be used.

Although the present description has proceeded in terms of the most usual two-state plasma cells, those skilled in the art will recognize the applicability of the present teachings to other than two-state cells, whether plasma cells or other basic light-emitting devices. By simply threshold-detecting light pen signals, it is possible to separate signals of varying intensity.

Numerous and various other modifications and adaptations of the present invention within the scope of the appended claims will occur to those skilled in the art.

Because the required additional apparatus is small, the present invention permits the realization of an interactive graphics capability at only a modest increase in complexity over simple display systems. Thus, applications of it in videotelephones and similar systems will be particularly attractive.

Although the present disclosure has proceeded primarily in terms of a plasma discharge display panel, it is clear that many of its features are equally applicable to other display systems having inherent memory or self-memory. For example, a system using the display and memory devices described in U.S. Pat. No. 3,651,493 issued to P. D. Ngo on Mar. 21, 1972 may use the present invention to advantage.

Further, though a rectangular array of display cells was used by way of illustration, it should be clear that arrays having other particular shapes with addressable locations may be used. For example, a circular panel having locations defined by polar coordinate values may have utility in some applications.

While the scan write and scan erase pulses were illustratively derived from corresponding normal write and erase signals, they may as well be generated by separate pulse generating circuitry in appropriate cases. Similarly, though particular pulse shaping was described for the scan erase and write signals, different shaping in accordance with the more general teachings contained herein may be used. Thus, e.g., when sufficiently large operating margins are provided by dynamic keep-alive operation or otherwise, a scan write pulse of normal write duration and lower amplitude may be utilized.

Finally, the terms positive and negative, as describing voltages and charges, e.g., are merely matters of convenient reference. When used consistently, exactly opposite levels may be used. Thus, e.g., a negative write (or scan write) pulse may be used in connection with a negative sustain pulse just as the corresponding positive pulses have been employed in the description above.

We claim:

1. Display apparatus comprising
an array of plasma discharge display cells,
sustain means for applying alternating polarity sustain signals to each of said cells, said sustain signals adding the memory signals stored in ON cells in said array to cause glow discharges thereat and to maintain said ON cells in the ON state, and
scan write means for applying a scan write pulse of a first polarity to at least a selected one of said cells, said scan write pulse having a predetermined magnitude sufficient to cause a glow discharge at said selected cell if it is in the OFF state, said scan write pulse having a predetermined duration, and said scan write pulse terminating at a predetermined time prior to the initiation of a respective one of said sustain signals of a second polarity,
said selected cell having a first flashing range if a pulse applied thereto has said predetermined duration, and terminates at said predetermined time and has an abrupt trailing edge, said selected cell further having a second flashing range if apulse applied thereto has said predetermined duration, terminates at said predetermined time and has a nonabrupt trailing edge, said first flashing range being greater than said second flashing range,
said scan write means characterized in that said predetermined magnitude lies within said first flashing range, and in that said scan write pulse has an abrupt trailing edge.

2. The invention of claim 1 wherein the low end of said first range comprises a magnitude below which a pulse applied to said selected cell having said predetermined duration, terminating at said predetermined time and having an abrupt trailing edge will not cause a glow discharge at said selected cell, wherein the low end of said second flashing range comprises a magnitude below which a pulse applied to said selected cell having said predetermined duration, terminating at said predetermined time and having a nonabrupt trailing edge will not cause a glow discharge at said selected cell, wherein the high end of said first flashing range comprises a magnitude above which a pulse applied to said selected cell having said predetermined duration, terminating at said predetermined time and having an abrupt trailing edge will cause said selected cell to switch to the ON state if it was theretofore in the OFF state, and wherein the high end of said second flashing range comprises a magnitude above which a pulse applied to said selected cell having said predetermined duration, terminating at said predetermined time and having a nonabrupt trailing edge will cause said selected cell to switch to the ON state if it was theretofore in the OFF state.

3. The invention of claim 2 wherein the time interval between said predetermined and said sustain signal initiation exceeds the recovery time associated with said predetermined magnitude and predetermined duration.

4. The invention of claim 2 further comprising one or more preconditioning sources external to said array of cells, each of said sources being activatable to provide preconditioning flux at each of said cells to facilitate glow discharges thereat,
means operative for activating one or more ones of said sources in a time relation with respect to the application of said scan write pulse to said selected cell, and
means for varying said time relation as a function of the position of said selected cell with respect to the positions of said one or more ones of said sources.

5. The invention of claim 2 further comprising light detecting means for generating a detecting signal in response to an adjacent glow discharge and means for generating a first pointing signal whenever said detecting signal occurs substantially contemporaneously with the application of said scan write pulse to said selected cell.

6. The invention of claim 5 further comprising means for applying a scan erase pulse to said selected cell, said scan erase pulse being adapted to cause a glow discharge at said selected cell if it is in the ON state, and means for generating a second pointing signal whenever said detecting signal occurs substantially contemporaneously with the application of said scan erase pulse to said selected cell.

7. Display apparatus comprising an array of plasma discharge display cells, sustain means for applying alternating polarity sustain signals to each of said cells, said sustain signals adding to memory signals stored in each ON cell in said array to cause a glow discharge thereat and to maintain the cell in the ON state, and scan write means for applying to selected ones of said cells scan write pulses each having a first polarity, a predetermined magnitude sufficient to cause a glow discharge at a cell which is in the OFF state, and a predetermined duration and each terminating at a predetermined time prior to the onset of a respective one of said sustain signals of a second polarity, each of said selected cells having a first flashing range for an individual one of said scan write pulses if it were to have an abrupt trailing edge and a second flashing range if it were to have a nonabrupt trailing edge, said first flashing range being greater than said second flashing range, said scan write means comprising means for establishing said predetermined magnitude within said first flashing range and for providing each scan write pulse with an abrupt trailing edge.

8. The invention of claim 7 wherein the low end of said first flashing range comprises a magnitude below which an individual one of said pulses if it had an abrupt trailing edge would not cause a glow discharge at a cell to which it is applied, wherein the low end of said second flashing range comprises a magnitude below which an individual one of said pulses if it had a nonabrupt trailing edge would not cause a glow discharge at a cell to which it is applied, wherein the high end of said first flashing range comprises a magnitude above which an individual one of said pulses if it had an abrupt trailing edge would cause a cell to which it is applied to switch to the ON state if it was theretofore in the OFF state, and wherein the high end of said second flashing range comprises a magnitude above which an individual one of said pulses if it had a nonabrupt trailing edge would cause a cell to which it is applied to switch to the ON state if it was theretofore in the OFF state.

9. The invention of claim 8 wherein said predetermined time precedes said sustain signal onset by at least the recovery time associated with said scan write pulses.

10. The invention of claim 8 further comprising one or more preconditioning sources external to said array of cells, each of said sources being activatable to provide preconditioning flux at each of said cells to facilitate glow discharges thereat, means operative for activating one or more ones of said sources in a time relation with respect to the application of an individual scan write pulse to an individual selected cell, said time relation being a function of the position of said individual cell with respect to the positions of said one or more ones of said sources.

11. The invention of claim 8 further comprising light detecting means for generating detecting signals in response to adjacent glow discharges and means for generating a first pointing signal whenever one of said detecting signals occurs substantially contemporaneously with the application of one of said scan write pulses to one of said selected cells.

12. The invention of claim 11 further comprising means for applying scan erase pulses to said selected cells, each scan erase pulse being adapted to cause glow discharge at a cell if that cell is in the ON state, and means for generating a second pointing signal whenever one of said detecting signals occurs substantially contemporaneously with the application of one of said scan erase pulses to one of said selected cells.

* * * * *